United States Patent
Kukic

(10) Patent No.: US 7,046,623 B2
(45) Date of Patent: *May 16, 2006

(54) FAULT RECOVERY SYSTEM AND METHOD FOR INVERSE MULTIPLEXED DIGITAL SUBSCRIBER LINES

(75) Inventor: Brana Kukic, Santa Rosa, CA (US)

(73) Assignee: Nokia Inc., Irving, TX (US)

( * ) Notice: Subject to any disclaimer, the term of this patent is extended or adjusted under 35 U.S.C. 154(b) by 808 days.

This patent is subject to a terminal disclaimer.

(21) Appl. No.: 09/751,808

(22) Filed: Dec. 29, 2000

(65) Prior Publication Data

US 2004/0213241 A1    Oct. 28, 2004

(51) Int. Cl.
*G01R 31/08* (2006.01)

(52) U.S. Cl. .............. 370/228; 370/242; 370/535

(58) Field of Classification Search ........ 370/225–228, 370/535–537, 242
See application file for complete search history.

(56) References Cited

U.S. PATENT DOCUMENTS

| | | | | |
|---|---|---|---|---|
| 5,155,483 A | * | 10/1992 | Morimoto | 370/228 |
| 5,343,464 A | * | 8/1994 | Iino et al. | 370/227 |
| 5,608,733 A | * | 3/1997 | Vallee et al. | 370/394 |
| 6,002,670 A | * | 12/1999 | Rahman et al. | 370/238 |
| 6,122,288 A | * | 9/2000 | Dashiff et al. | 370/465 |
| 6,574,191 B1 | * | 6/2003 | Usukura et al. | 370/216 |
| 6,580,688 B1 | * | 6/2003 | Klink | 370/220 |
| 6,647,028 B1 | * | 11/2003 | Lancon et al. | 370/535 |
| 6,813,241 B1 | * | 11/2004 | Wang et al. | 370/228 |
| 2003/0107999 A1 | * | 6/2003 | Peleg et al. | 370/252 |

OTHER PUBLICATIONS

The ATM Forum Technical Committee "Inverse Multiplexing for ATM (IMA) Specification, Version 1.0", AF-PHY-0086.000, Jul. 1997.

* cited by examiner

*Primary Examiner*—Ricky Q. Ngo
*Assistant Examiner*—Nittaya Juntima
(74) *Attorney, Agent, or Firm*—Darby & Darby PC; Bruce E. Black

(57) ABSTRACT

A system (10) and method are provided for restoring the flow of a data stream in the event of a link (28) failure while avoiding delays due to down time. The system (10) for passing the data stream at a particular transmission rate includes a first unit (20, 22) at the first location coupled to one end of each of a plurality of links (28), at least two trained links (28) selected from the links (28) that are set to active status, a second unit (22, 20) at the second location coupled to the other end of each of the links (28), and at least one idle link (28), wherein the first unit (20, 22) and the second unit (22, 20) switch to use the idle link (28) to replace any one of the trained links (28) that has failed.

7 Claims, 3 Drawing Sheets

FAULT RECOVERY SYSTEM AND METHOD FOR INVERSE MULTIPLEXED DIGITAL SUBSCRIBER LINES

BACKGROUND

This invention relates to telecommunication systems and, more specifically, to inverse multiplexing data streams over multiple links.

In telecommunication networks or systems, data or a data stream is transported from one location in the network to another location in the network at various data rates. Thus, the situation may arise, at some point in the network, where the transport or data rate for an incoming data stream exceeds the capacity of a single link over which the data stream needs to be transported. Known solutions to this problem teach that the data stream can be distributed or split into separate streams and the separate streams sent over multiple links or lines of lower capacity; the aggregate capacity of the lower capacity lines is sufficient to carry the data stream. This approach to splitting data or transporting the data stream over several links is known as "inverse multiplexing."

Even when a high capacity link is available in the network, which can handle the entire incoming data stream, the data stream may not make full use of the capacity of the single link. Thus, current standards teach that it may be preferable to inverse multiplex the data stream onto a number of lower capacity links and, thereby, fully utilize the capacity of the links in the network.

In a typical network, there are various bandwidths described in terms of data stream rates or bit rates. For example, a DS1 bit stream is transmitted at a line rate of 1.544 Mbps. The terms "DS1" and "T1" are used interchangeably herein. T1 is a full-duplex system: transmitted signals are transported on one wire pair, and received signals are transported on a separate wire pair. In each direction, the 1.544 Mbps data streams are organized according to a predetermined protocol. An alternative data rates is E1. E1 bit streams are transmitted at a line rate of 2.048 Mbps.

In order to transport data from one location to another, the data is packaged according to a predetermined protocol. One protocol is Asynchronous Transfer Mode (ATM). In accordance with ATM standards, the data is packaged in cells that are called ATM cells. Each ATM cell is 53 bytes in length, wherein each byte is an octet that is made up of eight bits. Each ATM cell includes a payload or information that is 48 octets in length and a header that is 5 octets in length. The header includes information about the payload type (PT) as well as other information. There are various forms of payload, including idle payload. Idle ATM cells may be present in an ATM data stream, and may be inserted or deleted by the equipment processing the ATM data stream. ATM equipment that communicates at rates exceeding the capacity of a T1 line, can communicate over multiple T1 lines, which have an aggregate capacity comparable to the capacity of the ATM data stream, using an inverse multiplexing arrangement.

In the inverse multiplexing scheme, the ATM data stream is divided over several low capacity lines, such as the T1 lines. For example, ATM Forum specification "Inverse Multiplexing for ATM (IMA) Specification Version 1.0," AF-PHY-0086.000 (July 1997) defines one approach to inverse multiplexing ATM cell streams on multiple T1 lines, which is incorporated herein by reference.

Depending on the transmission rate or bandwidth demand of the ATM data stream, the ATM data stream will have to be divided over several lower capacity lines. For example, if the data is received at a rate that is four times an optimal data rate of the lower capacity lines, then the incoming ATM cell stream will have to be inverse multiplexed onto or carried by at least four lines.

Known methods of inverse multiplexing teach that all of the low capacity links, among which the ATM data stream is inverse multiplexed, have to be trained at an optimal rate and synchronized so that each line is transmitting from the transmitter end to the receiver end at the same rate. Once the optimal rate is determined and selected, which is based on the number of links needed and the rate or bandwidth of each link, then all of the links operate at that optimal rate until one of the links fails and the optimal rate has to be recalculated.

The disadvantage of current solutions and, thus, the problem with the known methods of restoring traffic flow when a link failure occurs is the delay associated with recalculating the optimal rate and training the links at the recalculated optimal rate. In the event that any one of the links fail, then the optimal data rate for the entire group of links, which are associated with carrying the inverse multiplexed ATM data stream, have to be recalculated. The time taken to recalculate the rate and synchronize links at this new rate results in down time, and hence, a great deal of delay as a new optimal rate is calculated and the remaining functioning lines are trained at a new optimal rate. Calculation of a new optimal rate and the number links to use and to synchronize them at the new optimal rate can take several minutes. Thus, at a data rate of 8 Mbps for an ATM cell stream, every minute that there is a delay in restoring traffic flow 480 Mb of traffic stack up or are lost.

Therefore, what is needed is a system and method for restoring data flow without having the associated delay caused by calculating new optimal rate and, hence, eliminate the down time caused by a failure in a link.

SUMMARY

A system and method are provided for restoring the traffic flow of an ATM cell stream without having the delay associated with restoring traffic flow. The system for passing a cell stream at a particular transmission rate from a first location to a second location includes a first unit at the first location coupled to one end of each of a plurality of low capacity data links, at least two trained data links selected from the plurality of low capacity data links that are set to active status, a second unit at the second location coupled to the other end of each of the plurality of low capacity data links, and at least one trained idle data link, wherein the first unit and the second unit switch to use the trained idle data link to replace any one of the active trained data links that has failed.

The method for passing a cell stream from a first location to a second location to avoid delays due to data link failure includes the steps of selecting at least two data links from a plurality of data links, training the data links at an optimal rate, setting the status of the data links to active, selecting at least one other data link, training the other data link at the optimal rate, setting the status of the other data link to idle, and switching to use the trained idle data link when one of the active trained data links fails.

DETAILED DESCRIPTION

Figure 1:
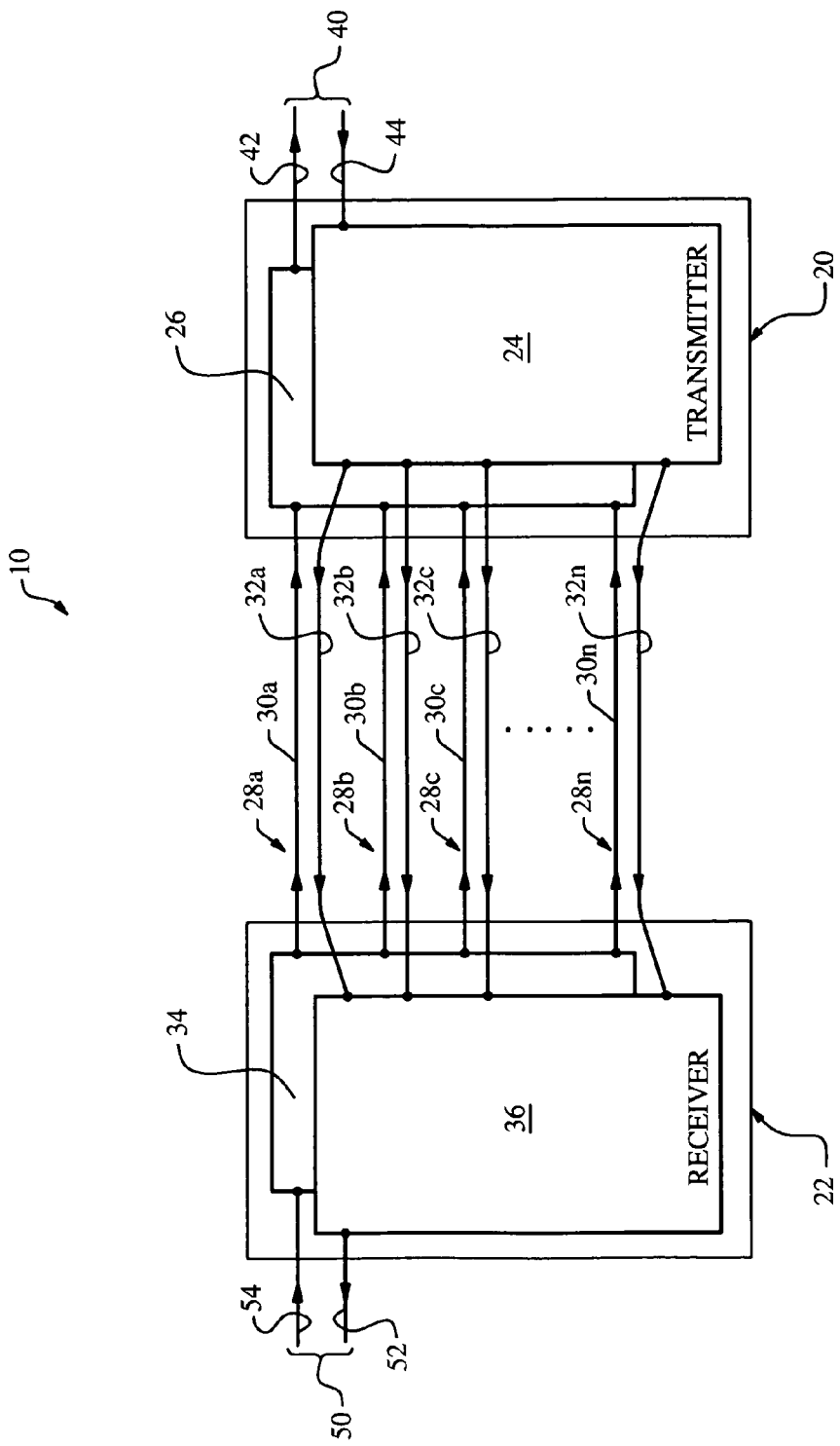
FIG. 1 is a block diagram of two inverse multiplexers (IMUXs) coupled by multiple bi-directional physical communication links for passing ATM cell streams over the links.

Referring now to FIG. 1, a system 10 includes at least two inverse multiplexers (IMUXs) 20 and 22 coupled by multiple physical communication links 28a–n. For illustration purposes, the IMUXs 20 and 22 are shown coupled by the physical communication links 28a–n that are T1 or DS1 links, which carry bi-directional format data streams. Each link 28 carries data streams in either direction at a specified rate, which depends on the link's characteristics. In the illustrative example, each of the links 28a–n carries one DS1 data stream 30a–n in one direction and another DS1 data stream 32a–n in the other direction. In other embodiments, data streams of different rates and formats, such as an E1, may be utilized.

Each of the links 28a–n can be a part of or pass through a public switched telephone network (PSTN). Furthermore, the links 28a–n may be physically separate, for instance, using separate conductors in separate cables, or using different paths through the PSTN. Also, links 28a–n may be physically combined for all or part of the path between IMUX 20 and 22. For example, the data streams may be multiplexed onto a higher capacity physical communication link, such as a DS3 link. Additionally, links 28a–n may exhibit different properties, including different transmission delays and different error rates.

The logical structure for the IMUX 20 and 22 can be implemented using a programmable processor, dedicated hardware, or both. A controller may, in some embodiments, be implemented as software processes executing on a programmable processor, under the control of software stored on a medium, such as a semiconductor read-only-memory (ROM). The controller may also include timing or clocking circuitry to determine the timing of data transfers between modules or unit. If the IMUX 20 and/or 22 includes a programmable processor, then software can be distributed to the IMUX 20 and/or 22, for example on a physical removable medium or over a data network.

The IMUX 20 includes a transmitter 24 and a receiver 26. For illustrative purposes, an ATM cell stream is discussed, but any form of data stream can be handled. The transmitter 24 accepts an inbound ATM cell stream 44 over a physical ATM communication link 40. The transmitter 24 of the IMUX 20 inverse multiplexes and sends the ATM cell stream 44 in the form of the DS1 data streams 32a–n over the links 28a–n, respectively, to the IMUX 22.

The IMUX 22 includes a transmitter 34 and the receiver 36. The receiver 36 receives the DS 1 data streams 32a–n from the transmitter 24 of the IMUX 20 and multiplexes the DS1 data streams 32a–n. The IMUX 22 can also receive an incoming ATM cell stream and inverse multiplex the incoming ATM cell stream over the links 28a–n. More specifically, the transmitter 34 of the IMUX 22 accepts an inbound ATM cell stream 54 over a physical ATM communication link 50. The transmitter 34 inverse multiplexes the ATM cell stream 54 in the form of DS1 data streams 30a–n over a selected number of the links 28a–n, respectively, that are then received by the receiver 26 of the IMUX 20. The receiver 26 multiplexes the DS1 data streams 30a–n to form an outbound ATM cell stream 42 that is transmitted over the ATM communication link 40.

The IMUXs 20 and 22 can be configured to use any number of the links 28a–n. Each of the DS1 data streams 30a–n on the links 28a–n, respectively, terminate at the receiver 26 of the IMUX 20 where the ATM cell stream 42 is reconstructed and sent over the ATM communication link 40. Likewise, the DS1 data streams 32a–n on the links 28a–n, respectively, each terminate at the receiver 36 of the IMUX 22, where an ATM cell stream 52 is reconstructed and sent on the ATM communication link 50.

In order for the ATM cell stream to be reconstructed, the ATM cells that are received at the receivers 26 and 36 from the links 28a–n must be multiplexed by the receivers 26 and 36 in the same order that the ATM cells were received at the transmitters 20 and 22 from the ATM communication links 40 and 50, respectively. Accordingly, a number of links from the links 28a–n must be selected, synchronized, and trained to operate at an optimal rate. Typically, the number of links that are selected from the links 28a–n depends on the data rate that the customer requests, the physical characteristics of each of the links 28a–n, and the number of available links. Based on these factors and other criteria, the optimal rate for each group of selected links 28 is selected.

In selecting the optimal transmission rate, various factors are considered, including the characteristics of each link 28. For example, if four links between the IMUX 20 and 22 are selected, such as links 28a–d, to carry the inverse multiplexed ATM cell stream, then four links are trained at the selected optimal rate. Calculation of the optimal rate is the subject of U.S. application Ser. No. 09/751,581 titled "Method and System for Establishing Link bit Rate for Inverse Multiplexed Data Streams" filed on Dec. 29, 2000 and incorporated herein by reference.

The selected optimal rate for any given link 28 will be the same as the selected optimal rate for all of the other links 28 and will depend on the characteristics of the links 28. Thus, the selected optimal rate should not exceed the maximum transmission rate of any one of the links 28. Additionally, the selected optimal rate for each link may result in less than all of the available links being utilized.

Figure 2:
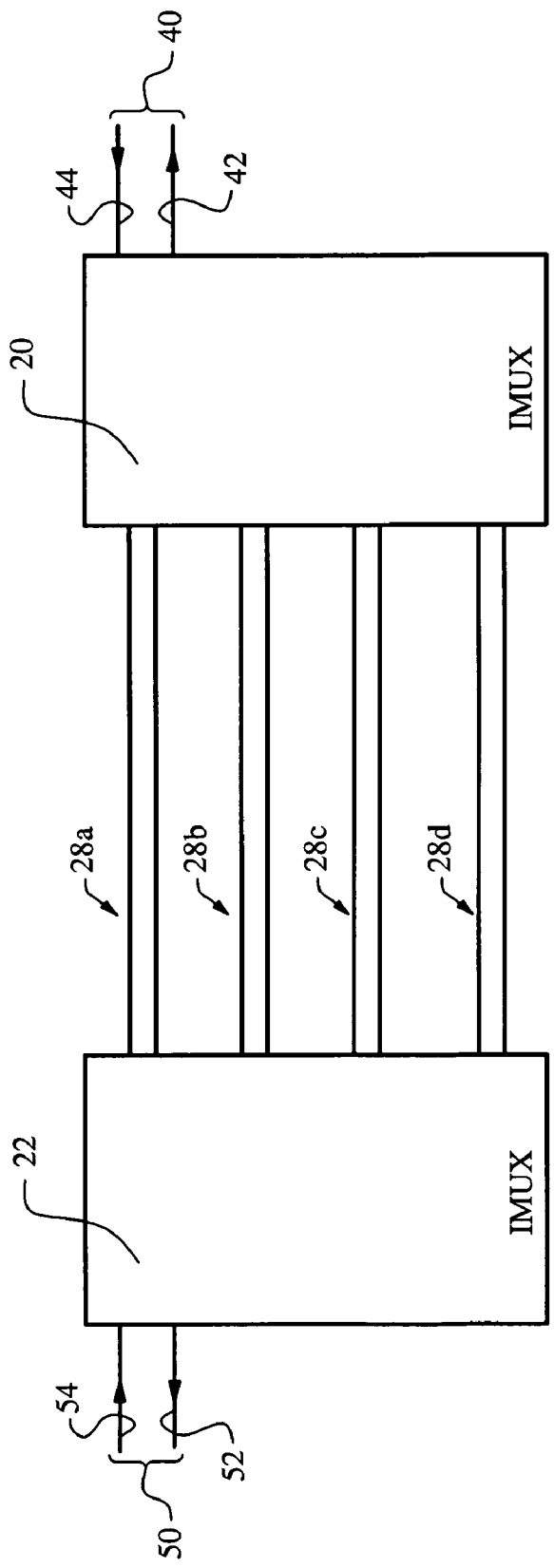
FIG. 2 is a block diagram of three active links and one idle link between the IMUXs of FIG. 1.

Referring now to FIG. 2, IMUXs 20 and 22 are shown, for illustration purposes, with four links 28a–d selected and available to carry the ATM cell streams 44 and 54 between the IMUX 20 and the IMUX 22. Although in this embodiment four links are shown, it will be apparent to those skilled in the art that any number of links can be used to carry ATM cell streams between the IMUX 20 and the IMUX 22. Furthermore, when specific numbers are used in the examples below, the intent is to illustrate various embodiments; it not intended to limit the scope and spirit of invention as claimed herein.

The data traffic is carried between the IMUXs 20 and 22 by the links 28a–d. In order to determine the optimal transmission rate for each link, the characteristics of each of the links are determined. It is the characteristics of the selected links 28a–d that will determine at what rate each of the links 28a–d will be trained and if all of the links 28a–d will be used.

For example, if the ATM cell stream rate requires a bandwidth or rate of 5.5 Mbps, and it is determined that each of the links 28a–d can carry a rate of 2 Mbps, then only three of the four links 28a–d are needed to carry the data between the IMUXs 20 and 22. Thus, three of the links, such as links 28a–c, are trained to operate at the 2 Mbps rate and carry the data as active links between the IMUXs 20 and 22.

In order to eliminate delays due to a link failure, the fourth available link, such as link 28d, is also trained to operate at the 2 Mbps rate, but acts as an idle link. Accordingly, if any one of the three active links 28a–c fails, then the idle link 28d can be used to immediately carry the traffic and, thereby, avoid the down time associated with having to retrain the failed link or add and train new links.

Figure 3:
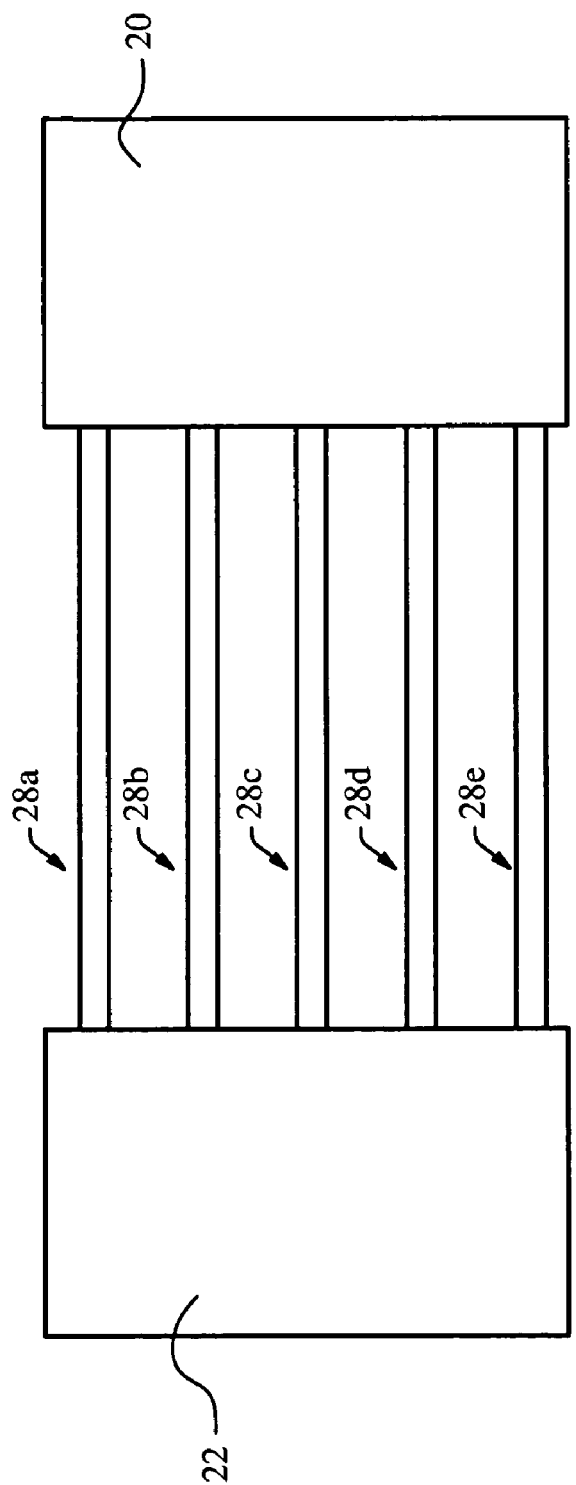
FIG. 3 is a block diagram of four active links and one idle link between the IMUXs of FIG. 1.

Referring now to FIG. 3, four links 28a–d are selected to carry an ATM cell stream that requires a bandwidth of or a rate of 8 Mbps. If it is determined that each of the links 28a–d can handle a bandwidth of 2 Mbps, then each link 28a–d is trained to operate at an optimal rate of 2 Mbps. Accordingly, in order to provide a total capacity of 8 Mbps all four links 28a–d are set to active status and trained at 2 Mbps. Thus, none of the links 28a–d can set to idle mode because all of the links 28a–d are needed in active status. Consequently, if the customer wants to avoid the down time associated with restoring traffic flow after a link failure, then a fifth link 28e can be selected and made available. The link 28e is trained at the optimal rate of 2 Mbps and set to idle status. Thus, if one of the links 28a–d fails, then the transmitter and receiver switch to the link 28e and traffic from the failed link is routed by the transmitter side of the traffic to the link 28e.

Although the link 28e is set to idle status and trained at 2 Mbps, the link 28e could potentially serve as a secondary resource to carry other traffic, with the primary designation for link 28e being to replace or take over traffic flow should any of the links 28a–d fail.

Once an idle link turns to an active status to take over for a failed link, then the idle link becomes one of the active links and the traffic flow continues as before. Meanwhile, if the failed link can be restored, then the failed link is restored and trained at the optimal rate and its status is set to idle. Thus, the link, which had failed before and was replaced, is now in idle status and ready to replace any of the links in the group, should any of the links in the group fail. The system is always attempting to retrain a failed link to become the idle link.

It is to be understood that the foregoing description is intended to illustrate and not limit the scope of the invention, which is defined by the scope of the appended claims. Other aspects, advantages, and modifications are within the scope of the following claims. Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A system for passing a cell stream at a particular transmission rate from a first location to a second location, the system comprising:
   a first unit at the first location coupled to one end of each of a plurality of low capacity data links for receiving the cell stream and inverse multiplexing the cell stream over at least two trained data links selected from the plurality of low capacity data links that are set to active status;
   a second unit at the second location coupled to the other end of each of the plurality of low capacity data links for receiving and multiplexing the inverse multiplexed cell stream from each of the active trained data links to produce the cell stream; and
   at least one data link selected from the plurality of low capacity data links that is trained and set to idle status, wherein the first unit and the second unit switch to use the trained idle data link to replace any one of the active trained data links that has failed and wherein the status of the idle data link is changed to active, thereby avoiding system down time due to line failure.

2. The system of claim 1, wherein the trained data links operate at an optimal transmission rate.

3. The system of claim 1, wherein the sum of the transmission rates of each of the active trained data links is at least equal to the transmission rate of the cell stream.

4. The system of claim 1, wherein the failed active data link is repaired and retrained at an optimal transmission rate and set to idle status.

5. A system for passing a cell stream at a particular transmission rate from a first location to a second location, the system comprising:
   a first unit at the first location coupled to one end of each of a plurality of links for receiving the cell stream and inverse multiplexing the cell stream over the links that are trained at a optimal rate and set to active status;
   a second unit at the second location coupled to the other end of each of the links for receiving and multiplexing the inverse multiplexed cell stream from each of the active links to produce the cell stream; and
   at least one link trained and set to idle status, wherein the first unit and the second unit switch to use the idle link to replace any one of the active links that has failed and wherein the status of the idle link is changed to active, thereby avoiding system down time due to line failure.

6. The system of claim 5, wherein the failed active link is retrained at the optimal rate and the status is set to idle.

7. A method for passing a cell stream from a first location to a second location to avoid delays due to data link failure, the method comprising:
   selecting at least two data links from a plurality of data links;
   training the at least two data links at an optimal rate;
   setting the status of the at least two data links to active;
   selecting at least one data link from the plurality of data links;
   training the at least one data link at the optimal rate;
   setting the status of the at least one data link to idle;
   at the first location, inverse multiplexing the cell stream over the data links that are trained at a optimal rate and set to active status;
   at the second location, receiving and multiplexing the inverse multiplexed cell stream from each of the active trained data links to produce the cell stream; and
   switching to use the trained idle data link when one of the active trained data links fails.

* * * * *

UNITED STATES PATENT AND TRADEMARK OFFICE
CERTIFICATE OF CORRECTION

PATENT NO. : 7,046,623 B2  Page 1 of 1
APPLICATION NO. : 09/751808
DATED : May 16, 2006
INVENTOR(S) : Brana Kukic It is certified that error appears in the above-identified patent and that said Letters Patent is hereby corrected as shown below:

Title Page Col. 2 (Attorney, Agent, or Firm) Line 1, Delete "PC;" and insert -- P.C.--.

Column 2, Line 34, After "calculating" insert -- a --.

Column 4, Line 31, After "Streams"" insert -- , --.

Column 4, Line 49, After "it" insert -- is --.

Column 6, Line 27 in Claim 5, after "at" delete "a" and insert -- an --.

Column 6, Line 52 in Claim 7, after "at" delete "a" and insert -- an --.

Signed and Sealed this

Thirtieth Day of January, 2007

JON W. DUDAS
*Director of the United States Patent and Trademark Office*